US010102611B1

(12) United States Patent
Murtha et al.

(10) Patent No.: US 10,102,611 B1
(45) Date of Patent: Oct. 16, 2018

(54) INTERCONNECTED 360 VIDEO VIRTUAL TRAVEL

(71) Applicant: XplorIt LLC, Incline Village, NV (US)

(72) Inventors: Gregory Murtha, Truckee, CA (US); Douglas Rhiner, Fairfax, CA (US)

(73) Assignee: XPLORIT LLC, Incline Village, NV (US)

( * ) Notice: Subject to any disclaimer, the term of this patent is extended or adjusted under 35 U.S.C. 154(b) by 8 days.

(21) Appl. No.: 15/785,213

(22) Filed: Oct. 16, 2017

(51) Int. Cl.
*G06T 3/00* (2006.01)
*G06T 19/00* (2011.01)
*H04N 5/04* (2006.01)
*G06T 19/20* (2011.01)

(52) U.S. Cl.
CPC .......... *G06T 3/0087* (2013.01); *G06T 19/003* (2013.01); *G06T 19/20* (2013.01); *H04N 5/04* (2013.01); *G06T 2210/62* (2013.01); *G06T 2219/2004* (2013.01)

(58) Field of Classification Search
CPC ..... G06T 3/0087; G06T 19/003; G06T 19/20; G06T 2210/62; G06T 2219/2004; H04N 5/04
See application file for complete search history.

(56) References Cited

U.S. PATENT DOCUMENTS

| 9,007,440 | B1* | 4/2015 | Jones | H04N 5/23238 348/46 |
| 9,165,338 | B2* | 10/2015 | Xu | H04N 5/23238 |
| 9,277,122 | B1* | 3/2016 | Imura | G06T 7/73 |
| 9,652,852 | B2* | 5/2017 | Becker | G06T 7/48 |
| 2014/0146044 | A1* | 5/2014 | Cvetko | G06T 19/003 345/420 |
| 2016/0148413 | A1* | 5/2016 | Oh | G06T 13/80 345/634 |
| 2018/0130264 | A1* | 5/2018 | Ebacher | H04N 5/23238 |

* cited by examiner

*Primary Examiner* — Nhon T Diep
(74) *Attorney, Agent, or Firm* — Dorsey & Whitney LLP

(57) ABSTRACT

System and method for synchronizing display of panoramic videos is disclosed. In one embodiment, a method of synchronizing display of panoramic video frames is discloses that includes transmitting a first panoramic image, displaying one or more first perspective frames based on the first panoramic image, determining an alignment parameter in response to a selected orientation of the first panoramic image, wherein the selected orientation has an associated one of the one or more first perspective frames, transmitting a second panoramic image, and displaying one or more second perspective frames based on the second panoramic image, wherein displaying the one or more second perspective frames includes displaying an initial one of the one or more second perspective frames having an orientation based on the alignment parameter.

6 Claims, 9 Drawing Sheets

INTERCONNECTED 360 VIDEO VIRTUAL TRAVEL

BACKGROUND

Mapping software today generally includes image or video features that provide actual image of certain real world features. These images may be correlated with map points that may be clicked on or otherwise selected to display the corresponding images. In some cases, images may be linked within an interactive map to provide some immersive continuity between map locations. Transitions may be provided between images, but are typically coarse, choppy, and generally lacking in an immersive feel that mimics real-world experience.

Thus, there is a need in the art for improved imaging and image transition handling in connection with geographic mapping and other contexts. These and other needs are addressed by the following disclosure.

SUMMARY

Systems and method for synchronizing display of panoramic videos is disclosed. In one embodiment, a method of synchronizing display of panoramic video frames is discloses that includes transmitting a first panoramic image, displaying one or more first perspective frames based on the first panoramic image, determining an alignment parameter in response to a selected orientation of the first panoramic image, wherein the selected orientation has an associated one of the one or more first perspective frames, transmitting a second panoramic image, and displaying one or more second perspective frames based on the second panoramic image, wherein displaying the one or more second perspective frames includes displaying an initial one of the one or more second perspective frames having an orientation based on the alignment parameter.

In another embodiment, a method of transitioning between panoramic video frames is disclosed that includes transmitting a first panoramic image sphere, displaying one or more first perspective frames of the first panoramic image sphere, receiving a destination point input, determining an alignment parameter based on a first orientation associated with one of the one or more first perspective frames that is being displayed, transmitting an intermediate panoramic image centered at a point between an origin point and a destination point, wherein the first panoramic image sphere is centered at the origin point, displaying one or more intermediate perspective frames of the intermediate panoramic image, wherein displaying the one or more intermediate perspective frames includes displaying an initial one of the one or more intermediate perspective frames having a second orientation based on the alignment parameter, and transmitting a destination panoramic image centered at the destination point, and displaying one or more destination perspective frames of the destination panoramic image sphere, wherein displaying the one or more destination perspective frames includes displaying an initial one of the one or more destination perspective frames having a third orientation based on the alignment parameter.

In another embodiment, a method of synchronizing display of panoramic videos, is disclosed that includes loading a first panoramic image into a lower graphics layer, displaying one or more first perspective frames with an upper graphics layer at full transparency, wherein the one or more first perspective frames are generated based on the first panoramic image and a first orientation, loading a second panoramic image into the upper graphics layer, and displaying one or more second perspective frames with the upper graphics layer at full opacity, wherein the one or more second perspective frames are generated based on the second panoramic image beginning with an initial one of the one or more second perspective frames having a second orientation that is based on an alignment parameter, wherein the alignment parameter is determined based on a third orientation associated with a particular one of the one or more first perspective frames displayed in response to display transitioning from the first panoramic image to the second panoramic image.

In another embodiment, a system for synchronizing display of panoramic videos is disclosed that includes a geographic coordinate mapping module configured to generate one or more first perspective frames based on a first panoramic image sphere, the geographic coordinate mapping module configured to receive an input including latitude and longitude coordinates for a user-selected destination point and an origin point for the first panoramic image sphere, the geographic mapping module configured to calculate a an intermediate point based on the input, and a synchronization engine coupled to the geographic coordinate mapping module, the synchronization engine configured to receive the destination point and the intermediate point from the geographic coordinate mapping module, and to provide intermediate and destination panoramic images, wherein the intermediate panoramic image is centered on the intermediate point and used to generate one or more intermediate perspective frames beginning with an initial one of the one or more intermediate perspective frames having a first orientation based on an alignment parameter, the destination panoramic image is centered on the destination point and used to generate one or more destination perspective frames beginning with an initial one of the one or more destination perspective frames having a second orientation based on the alignment parameter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
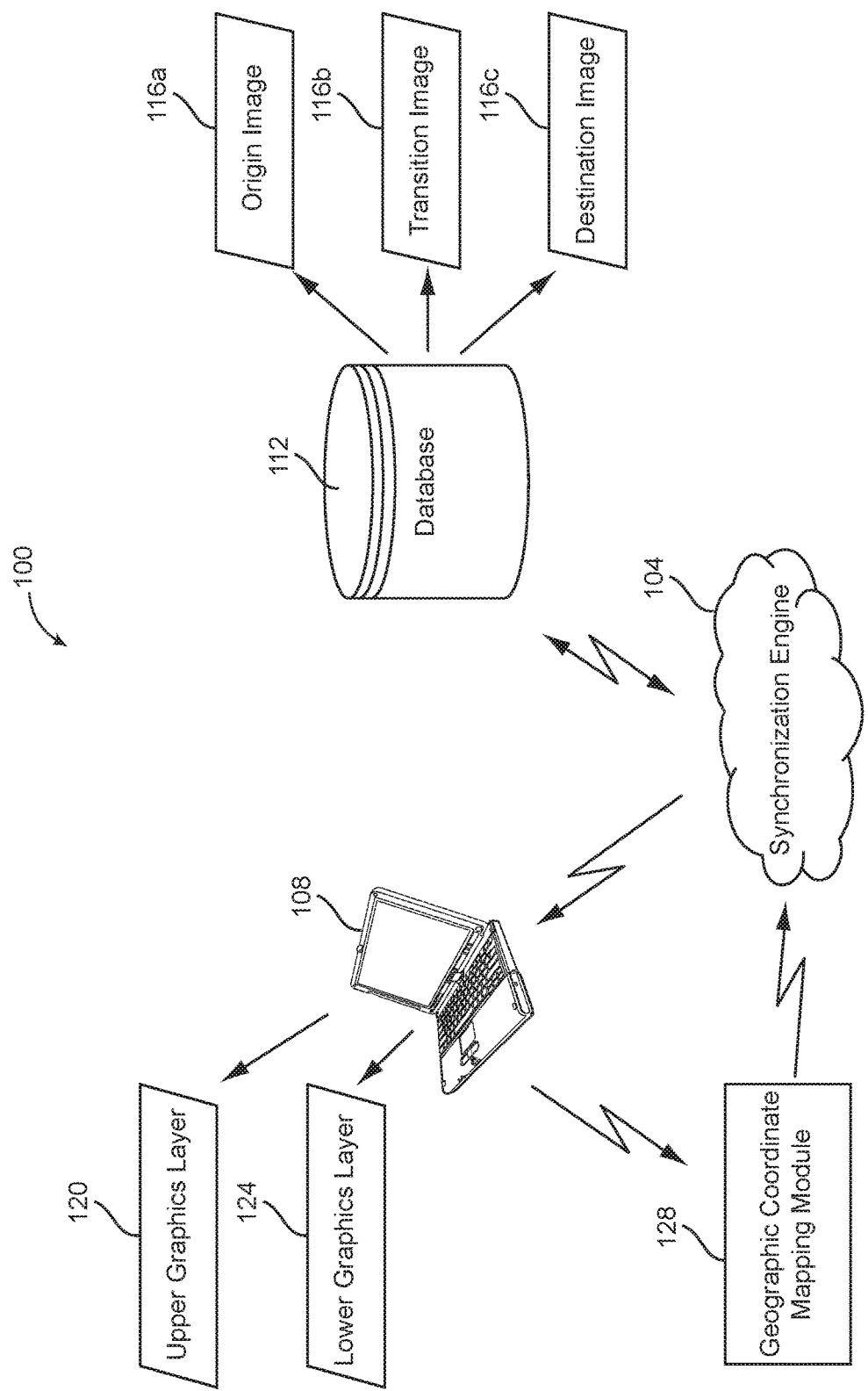
FIG. 1 is a schematic diagram of a network that includes components and features in accordance with the present disclosure.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

FIG. 1 is a schematic diagram of a network 100 that includes components and features in accordance with the present disclosure. The network 100 includes a synchronization engine 104 in accordance with the present disclosure. The synchronization engine 104 is generally configured to synchronize display of one or more panoramic images. The synchronization engine 104 may be coupled to a user device 108 that displays the panoramic images. The user device 108 may be a computing device such as a laptop, desktop, palmtop computer, and so on. A user device 108 implemented as a laptop computer is illustrated in FIG. 1 by way of example and not limitation. In one example, the synchronization engine 104 may be implemented as network device such as file server, media server, or the like. In this example, the synchronization engine 104 and the user device 108 may communicate across a computer or data network such as the Internet. The synchronization engine 104 may additionally be coupled to a database 112. The database may include panoramic images 116a-c (collectively "panoramic images 116."). In particular, FIG. 1 includes three panoramic image types 116a-c by way of example and not limitation.

Panoramic images in accordance with the present disclosure may be images having a wide field of view. A panoramic image generally has a field of view that is wider than that of normal human vision. Human eyes face outward from the head providing a view that is directly forward. Human vision includes a peripheral component that somewhat laterally extends the field of view. Objects and/or areas that are outside of this peripheral range, such as objects that are behind or above the head, cannot be seen without turning or titling the head. In contrast, a panoramic image can include a lateral range that is outside of the range provided by human peripheral vision. In one example, a panoramic image may have a 180 degree field of view. In another example, a panoramic image may have a 270 degree field of view. A panoramic image may have a field of view up to and including a 360 degree field of view. Additionally, the panoramic image may have vertical components with viewpoints that are oriented up to 90 degrees in an upward direction. A panoramic image that includes 360 degrees of lateral view with viewpoints that are oriented 90 degrees in an upward direction may be referred to herein as "spherical panoramic" images.

A panoramic image in accordance with the present disclosure may be generated with specialized camera equipment. For example, a panoramic image may be shot with a panoramic camera that includes a spherical lens that is configured to capture images that span a 360 degree field of view. In other embodiments, a panoramic image may be generated from non-panoramic images using specialized software that pieces together different images that are shot with a non-panoramic camera. Panoramic images may be still images, image frames, or moving video images. A panoramic still image may be a single image that encompasses a 360 degree field of view. A panoramic video may be an ordered sequence of such still images. A panoramic still or video image may be a spherical panoramic image having 360 degrees of lateral view with viewpoints that are oriented 90 degrees in an upward direction.

The user device 108 may have a graphic functionality that is implemented through a graphics card, graphics processer, or similar component that is configured to process image files for display on a monitor, screen, or other display surface. Alternatively and/or additionally, the graphic functionality is performed remote from the user device 108, for example, by a cloud-based server communicatively coupled to the user device 108. The user device 108 may be configured with graphics functionality that includes at least first and second graphic layers. The graphics layers may be configured in a hierarchical relationship where one layer is configured as an upper graphics layer 120 that is arranged above the second layer, which is configured as a lower graphics layer 124. The upper graphics layer 120 may be configured with an adjustable transparency. The upper graphics layer 120 may be adjusted through a range of transparency settings from full transparency to full opacity. With the upper graphics layer 120 at full transparency, only the lower graphics layer 124 is visible. With the upper graphics layer 120 at full opacity, only the upper graphics layer 120 is visible. With the upper graphics layer 120 set to an intermediate level of transparency, a combination of the upper graphics layer 120 and the lower graphics layer 124 is visible.

The synchronization engine 104 may utilize the different graphic layers associated with the user device 108 in providing a synchronization between panoramic images 116. For example, the synchronization engine 104 may load a first panoramic image 116a into the lower graphics layer 124 and a second panoramic image 116b into the upper graphics layer 120. The synchronization engine 104 may transition between the panoramic images 116a-b by changing the transparency of the upper graphic layer 120. For example, the upper graphics layer 120 may initially be transparent so that the first panoramic image 116a, which is loaded in the lower graphics layer 124, is displayed. The synchronization engine 104 may then bring the upper graphics layer 120 to full opacity. In this configuration, the second panoramic image 116b, which is loaded in the upper graphics layer 120, is displayed. The synchronization engine 104 may bring the upper graphics layer 120 to full opacity over a period of time so as to provide a gradual transition.

Similar to human vision, monitors and other display devices are typically not panoramic. Thus, it may be challenging for the user device 108 to display an entire panoramic image all at once on a monitor or other display surface without distortion. In order to avoid distortion of the image, it may be advantageous for the user device 108 to display a panoramic image in a piecemeal fashion. The user device 108 may, for example, display a particular subsection of the panoramic image 116 at a given time. The user device 108 may include a panning and/or tilting function that allows a viewer to shift the perspective of the panoramic image 116 resulting in a different subsection being displayed. As mentioned, a panoramic still image or a given unit of a panoramic video may be referred to herein as a panoramic image sphere. Here, the sphere may be centered on a point outward from which a view looks. The center of a panoramic sphere may coincide with the location of the camera used to shoot the panoramic video. A particular subsection of a panoramic image may be referred to herein as a "frame."

The user device 108 may display a panoramic image on a frame-by-frame basis. When a panoramic image is loaded into a graphics layer, the panoramic image may be provided with an initial orientation according to which an initial frame may be displayed. The initial orientation may be a default orientation or may be programmatically set to provide continuity with a previous panoramic image. The user device 108 may initially display the panoramic image 116 with an initial frame having a particular orientation and then shift to one or more subsequent frames, which may have a different orientation or different orientations. The user device 108 may receive input that shifts the orientation such that a subsequent point of view is established. In response, the user device 108 may display a different frame of the panoramic image that corresponds to the subsequent point of view. The user device 108 may generate the subsequent frame by panning and/or tilting the panoramic image. In the case of panoramic still images, the various frames may be different perspectives of the same still image. In the case of panoramic video images, the various frames may be different frames of the video oriented at different perspectives. Here, the user device 108 may change the orientation of the viewer as the video plays.

The synchronization engine 104 may utilize an alignment parameter that defines an orientation for one or more panoramic images. In accordance with present embodiments, the alignment parameter may be a stored value or set of values that specifies a particular orientation. The orientation specified by the alignment parameter may correspond to a viewer orientation with respect to a panoramic image. In one example, the alignment parameter includes an angular displacement value that specifies an angular orientation with respect to a reference line. The angular displacement value may be implemented as an angular displacement value that represents an amount of rotation away from a geographic reference line. In one embodiment, 0 degrees north is used as the reference line. However, any particular reference line may be used. The alignment parameter may additionally include a vertical pitch value. The vertical pitch value may be implemented as an angular value that represents an amount of rotation away from a horizontal reference line. The vertical pitch value may range between +90 degrees and −90 degrees. Here, +90 degrees corresponds to a viewer looking directly upward and −90 degrees corresponds to a viewer looking directly downward. A particular vertical pitch value may span this entire range or a fraction of the entire range.

In one embodiment, the synchronization engine 104 may utilize the alignment parameter to synchronize the display of a two panoramic images. The alignment parameter may be used to record an orientation of a final frame of a panoramic image displayed by the user device 108. When loading a subsequent panoramic image, the synchronization engine 104 may then reference the alignment parameter in orienting a first frame of the subsequent panoramic image. The one or more numerical values associated with the alignment parameter may be stored locally at the user device 108. Alternatively, the values may be remotely stored, such as in the database 112. The alignment parameter may be set or updated at a time the synchronization engine 104 transitions the user device 108 between different panoramic images. When such transition is set to occur, the orientation of final frame of the first panoramic image may be stored as the alignment parameter. The synchronization engine 104 may then reference the alignment parameter in selecting the initial frame of the second panoramic image.

By way of example, the user device 108 may display a first panoramic image and the synchronization engine 104 may transition the user device 108 to displaying a second panoramic image. The user device 108 may display the first panoramic image for a certain time that allows for a user input that selects one or more different perspective on the first panoramic image. As described above, the user device 108 may respond to the selection of different perspectives by displaying an image frame having an orientation corresponding to the user selection. In the event that the first panoramic image 116a is a still image, the still image may be displayed for a time that allows the user to select different perspectives on the still image. In the event that the first panoramic image 116a is a video, the user may select different perspectives as the video plays. In either case, display of the first panoramic image 116a may end with the display of a final image having a particular orientation. Once display of the first panoramic image is complete, the orientation of the final frame may be stored as the alignment parameter. When loading the second panoramic image, the synchronization engine 104 may use the alignment parameter to match the orientation of the first frame of the second panoramic image to the final frame of the first panoramic image.

The synchronization engine 104 may be additionally configured to provide transitions between panoramic images that correspond to specific geographic points. In this regard, the network 100 may include a geographic coordinate mapping module 128. The geographic coordinate mapping module 128 may be coupled to the user device 108 and/or the synchronization engine 104. The geographic coordinate mapping module 128 may map user input to geographic points and then provide these geographic points as input to the synchronization engine 104. More specifically, the geographic coordinate mapping module 128 may be generally configured to map user input provided through the user device 108 to specific geographic points. For example, the user may select points on a map or video that is displayed by the user device 108. The geographic coordinate mapping module 128 may map this input to specific geographic coordinates. The geographic coordinates may be specified by latitude and longitude in one embodiment. The synchronization engine 104 may then fetch a particular panoramic video having a correspondence with the selected geographic point.

The synchronization engine 104 may cooperate with the geographic coordinate mapping module 128 to provide a composite transition between an origin image and a destination image. The origin image may correspond to a panoramic image that is currently loaded and displayed by the user device 108. While the origin image is displayed by the user device 108, the user device 108 may receive input that specifies a particular destination. For example, a user may click on a particular area of the displayed video or a particular point on a geographic map. The geographic coordinate mapping module 128 may processes this input and generate geographic coordinates that correspond to the selected destination point. The geographic coordinate mapping module 128 may also calculate an intermediate geographic point that is between the origin point and the destination point. The geographic coordinate mapping module 128 may then provide the intermediate and destination points to the synchronization engine 104 as input. Based on this input, the synchronization engine 104 may access the database 112 to fetch a transition image 116*b* corresponding to the intermediate point and a destination image 116*c* corresponding destination point. The synchronization engine 104 may then transmit the transition image 116*b* to the user device 108, followed by the destination image 116*c*. The synchronization engine 104 may utilize an alignment parameter and the different graphic layers 120, 124 associated with the user device 108 to provide a continuous transition between the origin and transition images 116*a-b* and between the transition and destination images 116*b-c*. The process of providing a continuous transition is described in greater detail with reference to FIG. 2.

Figure 2:
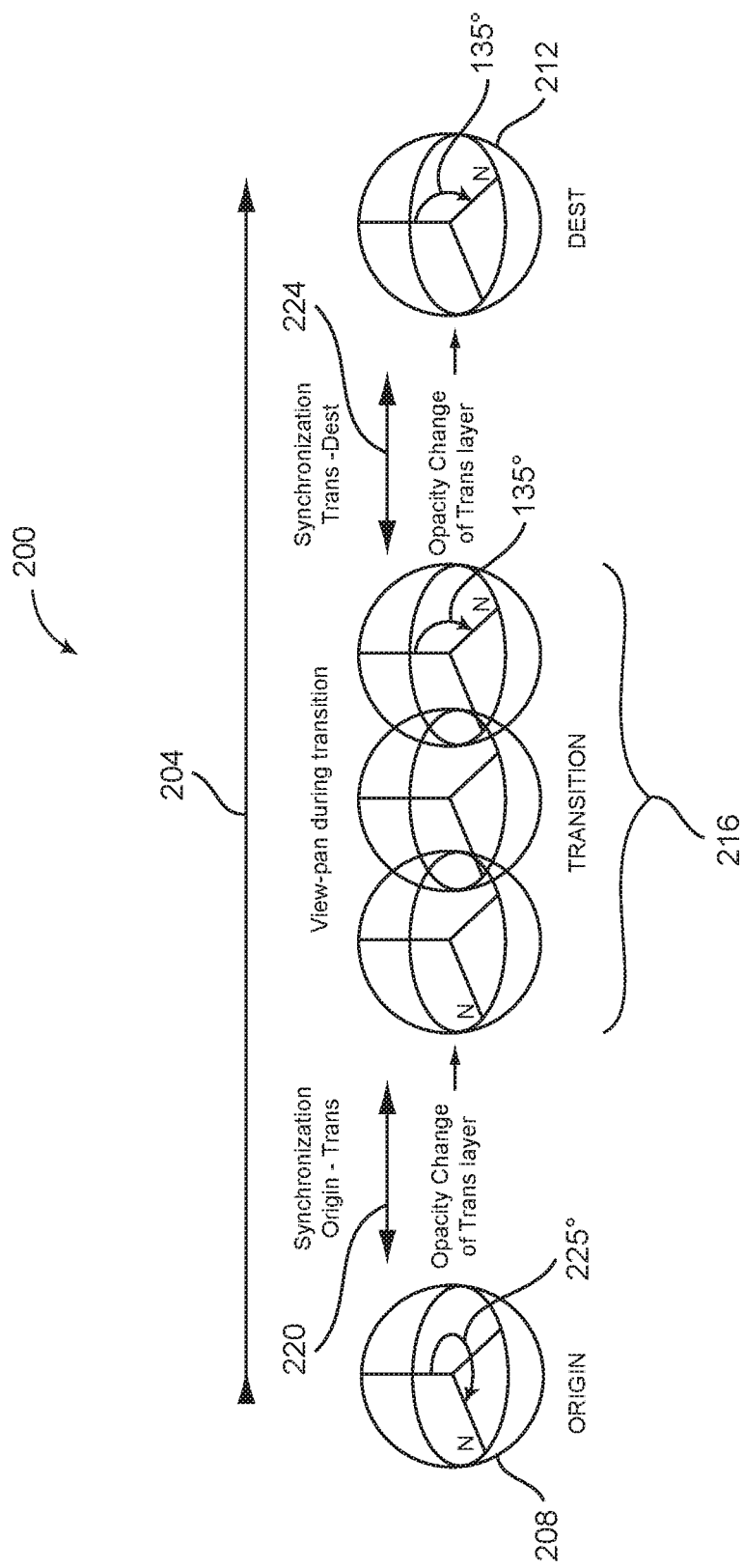
FIG. 2 is a schematic diagram of a composite transition from an origin image to a destination image.

FIG. 2 is a schematic diagram 200 of a composite transition 204 from an origin image 208 to a destination image 212. The origin image 208 and destination image 212 may correspond, respectively, to the origin image 116*a* and destination image 116*c* of FIG. 1. The composite transition 204 additionally includes a transition image 216 between the origin image 208 and the destination image 212. The transition image 216 may correspond to the transition image 116*b* of FIG. 1. The composite transition 204 may include a first transition 220 between the origin image 208 and the transition image 216. The composite transition 204 may also include a second transition 224 between the transition image 216 and the destination image 212. In FIG. 2, the origin image 208, the transition image 216, and the destination image 212 are represented as spherical panoramic images by way of example and not limitation. It should be understood that the origin image 212, the transition image 216, and the destination image 212 may be non-spherical images in some embodiments.

The origin image 208 may correspond to a panoramic image that is loaded and displayed by the user device 108 at the time that the composite transition 204 is calculated and executed. As illustrated in FIG. 2, the origin image 208 may be a spherical panoramic image. Thus, the origin image 208 may be a panoramic image that includes 360 degrees of lateral view with viewpoints that are oriented 90 degrees in an upward direction. The user device 108 may be configured to display spherical panoramic images that are still images or spherical panoramic images that are moving video images. By way of example, the following discussion refers to the origin image 208 and to other images shown in FIG. 2 as moving videos. However, it should be understood that the discussion additionally applies to still images. Thus, the origin image 208 may correspond to a particular unit of a moving video.

The As described in connection with FIG. 1, the user device 108 that displays the origin image 208 may have a graphics functionality that includes at least the upper graphics layer 120 and the lower graphics layer 124. The upper graphics layer 120 may be configured with an adjustable transparency that ranges from full transparency where the lower graphics layer 124 is visible to full opacity where the upper graphics layer 120 is visible. With the upper graphics layer 120 set to an intermediate level of transparency, a combination of the upper graphics layer 120 and the lower graphics layer 124 is visible. By way of example, at a time before the composite transition 204 is calculated and executed, the origin image 208 may be loaded into the lower graphic layer 124 and the upper graphic layer set to full transparency such that the origin image 208 is visible.

As the user device 108 displays the origin image 208, the user device may receive input that selects a particular destination. As described in connection with FIG. 1, a user may click on a particular area of the displayed video or a particular point on a geographic map. In response, the synchronization engine 104 may calculate the composite transition 204, which is illustrated in FIG. 2. As mentioned, the synchronization engine 104 may be associated with a geographic coordinate mapping module 128 that is configured to process user selections and generate geographic coordinates in response. As part of calculating the composite transition 204, the geographic coordinate mapping module 128 may process the destination selection input received as the origin image 208 is displayed and, in response, generate geographic coordinates for the destination point. The geographic coordinate mapping module 128 may additionally generate geographic coordinates for an intermediate point between an origin point and the destination point, where the origin point corresponds to a center of the origin image 208.

The geographic coordinate mapping module 128 may provide the intermediate and destination points to the synchronization engine 104 as input. Based on this input, the synchronization engine 104 may access a database to fetch the transition image 216 based on the intermediate point and to fetch the destination image 212 based on the destination point. As part of executing the composite transition 204, the synchronization engine 104 may then transmit the transition image 216 and the destination image 212 to the user device 108. As shown in FIG. 2, the composite transition 204 includes a first transition 220 between the origin image 208 and the transition image 216, and a second transition 224 between the transition image 216 and the destination image 212. The second transition 224 typically occurs after the transition image 216 has played for certain amount of time. In that regard, the synchronization engine 104 may transit the destination image 212 after a certain time delay that allows for complete playing of the transition image 216.

The synchronization engine 104 may utilize an alignment parameter to provide for a continuous transition between images in the composite transition 204. As mentioned in connection with FIG. 1, an alignment parameter in accordance with the present disclosure may include an angular displacement value and/or vertical pitch value that together specify a particular viewer orientation with respect to a panoramic image. As part of calculating the composite transition 204, the synchronization engine 104 may set an initial value for the alignment parameter based on the initial image 208. More specifically, the synchronization engine 104 may set the alignment parameter based on an orientation of a final frame that is displayed in connection with the initial image 208. This final frame may correspond to the frame that is displayed by the user device 108 when the first transition 220 begins. The alignment parameter determined in this way may be stored locally at the user device 108 or stored remotely, such as at the database 112.

In executing the first transition 220, the synchronization engine 104 may reference the alignment parameter which was originally calculated based on the final frame of the origin image 208. If the alignment parameter is stored remotely, the synchronization image 104 may transmit the alignment parameter to the user device 108 along with the transition image 216. In other embodiments, the alignment parameter may be accessed locally at the user device 108. In order to provide a continuous transition, the user device 108 may display the transition frame 216 beginning with an initial frame that is selected based on the alignment parameter. This continuous transition is illustrated in FIG. 2, which shows an alignment between the final frame of the origin image 208 and the initial frame of the transition image 216. In general, the origin image 208 may be a panoramic spherical video that is played at the user device 108 beginning with an initial frame, which may be determined by a default orientation. Display of the origin image 208 ends with the display of a final image having a particular orientation and storage of that orientation as the alignment parameter. The display and orientation of this final origin image 208 is represented in FIG. 2 with a single spherical image having a north director ("N") aligned at approximately 225 degrees. When loading the transition image 216, the synchronization engine 104 may use the alignment parameter to match the orientation of the first frame of the transition image 216 to this final frame of the origin image 208. The display and orientation of this initial transition image 216 is represented in FIG. 2 with an initial spherical image having a north director ("N") aligned at approximately 225 degrees.

Once the transition image 216 is loaded, the user device 108 may display the transition image 216 on a frame-by-frame basis. As mentioned, the user device 108 may initially display the transition image 216 with an initial frame having an orientation that is programmatically set based on the alignment parameter. Display of the transition image 216 may then shift to one or more subsequent frames, which may have a different orientation or different orientations. The user device 108 may receive input that shifts the orientation such that a subsequent point of view is established. In response, the user device 108 may display a different frame of the transition image 216 that corresponds to the subsequent point of view. The user device 108 may generate the subsequent frame by panning and/or tilting the transition image 216 to different frames of the video oriented at different perspectives. Here, the user device 108 may change the orientation of the viewer as the video corresponding to the transition image 216 plays. The display and orientation of the various frames of the transition image 208 is represented in FIG. 2 beginning with an initial spherical image having a north director ("N") aligned at approximately 225 degrees. As the transition image 216 plays, user input is received that shifts the viewer perspective of the transition image 216. This shift in perspective is represented in FIG. 2 with a final spherical image having a north director ("N") aligned at approximately 135 degrees.

Input received by the user device 108 that shifts the orientation of transition image 216 may be provided by a viewer or other user of the user device 108. The viewer may provide such input to establish one or more different viewpoints on the transition image 216. In this way, the view may effectively "look around" within the transition image 216. User input that allows the user to look around within the image in this way provides for an immersive video experience that simulates the everyday experience of turning one's head to gain a different perspective. For example, in everyday experience, a person may turn their head to obtain a better view of an object that is within their peripheral vision or that is outside their current visual range. In a similar way, a viewer may provide input to the user device 108 that shifts the viewing perspective left, right, up, down, or a combination of these directions. Embodiments in accordance with the present disclosure provide for user input that shifts viewer perspectives during display of the transition image 216 to provide for a continuous and immersive visual experience as display transitions from the origin image 208 to the destination image 212.

As input is received by the user device 108 that shifts the orientation of transition image 216, the user device 108 and/or the synchronization engine 104 may update the alignment parameter. The alignment parameter may be updated in this manner so that the alignment parameter accurately reflects a current user perspective. As user input changes the viewing perspective that is used in connection with displaying a frame from a panoramic image, a corresponding change is made to the alignment parameter. Thus, when the second transition 224 is executed and the destination image 212 is loaded, an initial frame may be selected that matches the final frame of the transition image 216. The alignment parameter may be stored locally or remotely and updates to the alignment parameter may be made accordingly. In one embodiment, the alignment parameter is only updated based on the final frame of the transition image 216. In this way, the alignment parameter is updated only once during display of the transition image 216. Once display of the transition is finished, the synchronization engine 104 may proceed to the second transition 224.

In executing the second transition 224, the synchronization engine 104 may again reference the alignment parameter. Because the alignment parameter is updated based on user inputs received during display of the transition image 216, the alignment parameter, as accessed during the second transition, represents a current viewer perspective. Thus, in order to provide a continuous transition, the user device 108 may display the destination image 212 beginning with an initial frame that is selected based on the alignment parameter. This continuous transition is illustrated in FIG. 2, which shows an alignment between the final frame of the transition image 216 and the initial frame of the destination image 216. As mentioned, the transition image 216 may be a panoramic spherical video that is played at the user device 108 beginning with an initial frame, which may be determined by a programmatically defined orientation. Display of the transition image 216 ends with the display of a final image having a particular orientation and updating of the alignment parameter based on that orientation. The display and orientation of this final transition image 208 is represented in FIG. 2 with a final spherical image having a north director ("N") aligned at approximately 135 degrees. When loading the destination image 212, the synchronization engine 104 may use the alignment parameter to match the orientation of the first frame of the destination image 212 to this final frame of the transition image 216. The display and orientation of this initial destination image 212 is represented in FIG. 2 with a single spherical image having a north director ("N") aligned at approximately 135 degrees.

The synchronization engine 104 may utilize the different graphic layers associated with the user device 108 in providing a synchronization between panoramic images 208, 216, 212. As mentioned, at a time before composite transition 204 is calculated and executed, the origin image 208 may be loaded into the lower graphic layer 124 and the upper graphic layer set to full transparency such that the origin image 208 is visible. As part of the first transition 220, the synchronization engine 104 may load the transition image 216 into the upper graphics layer 120. The synchronization engine 104 may transition between the origin image 208 and the transition image 216 by bringing the upper graphics layer 120 to full opacity. In this configuration, the transition image 216, which is loaded in the upper graphics layer 120, is displayed. The synchronization engine 104 may bring the upper graphics layer 120 to full opacity over a period of time so as to provide a gradual transition. As part of the second transition 220, the synchronization engine 104 may load the destination image 212 into the lower graphics layer 124. The synchronization engine 104 may transition between the transition image 216 and the destination image 212 by bringing the upper graphics layer 120 to full transparency. In this configuration, the destination image 216, which is loaded in the lower graphics layer 124, is displayed. The synchronization engine 104 may bring the upper graphics layer 120 to full transparency over a period of time so as to provide a gradual transition. These operations of the synchronization engine 104 are discussed in greater detail in connection with FIGS. 3A-C.

Figure 3A:
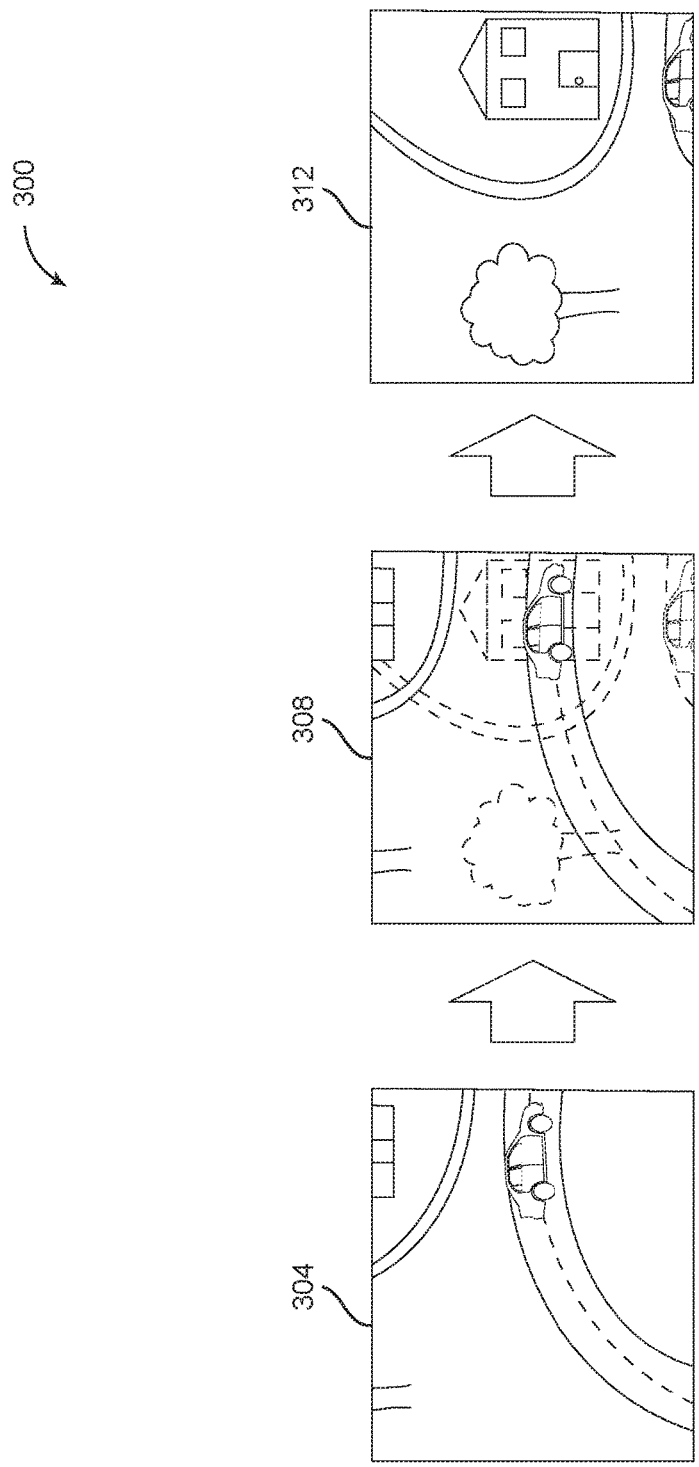
FIGS. 3A-C are illustrations of example transitions in accordance with present embodiments.

FIG. 3A is an illustration of an example transition 300 in accordance with present embodiments. The transition 300 may correspond to the first transition 220 of FIG. 2. As mentioned, it may be challenging for a user device 108 to display an entire panoramic image all at once on a monitor or other display surface without distortion. In order to avoid distortion of the image, the user device 108 may display a panoramic image in a piecemeal fashion by displaying a particular subsection of a panoramic image at a given time. In this regard, the transition 300 of FIG. 3 includes a plurality of frames that each include a particular subsection of a panoramic image corresponding to a view of the panoramic image from a particular viewing perspective. The transition 300 of FIG. 3 shows three frames by way of example and not limitation. The three frames are displayed in order from first frame 304, second frame 308, to third frame 312. Intermediate frames that may be displayed between the first frame 304 and the second frame 308 or between the second frame 308 and the third frame 312 are omitted to simplify the drawing.

The first frame 304 may correspond to the final frame of the initial image 208 that is displayed at the beginning of the first transition 220. Initially, the first frame 304 may be loaded into the lower graphic layer 124 and the upper graphic layer set to full transparency such that the origin image 208 is visible. As part of the transition 300, the synchronization engine 104 may load a transition image into the upper graphics layer 120. The synchronization engine 104 may transition between the origin image and the transition image by bringing the upper graphics layer 120 to full opacity. The synchronization engine 104 may bring the upper graphics layer 120 to full opacity over a period of time so as to provide a gradual transition. This gradual transition is represented by the second frame 308, which may occur with the upper graphic layer 120 at an intermediate transparency level. Thus, in the second frame 308, the origin image and the transition image are both partially visible. The third frame 312 may correspond to the initial frame of the transition image 216 that is displayed at the end of the first transition 220. In the third frame 312, the upper graphic layer 120 is at full opacity and the transition image, which is loaded in the upper graphics layer 120, is displayed.

Figure 3B:
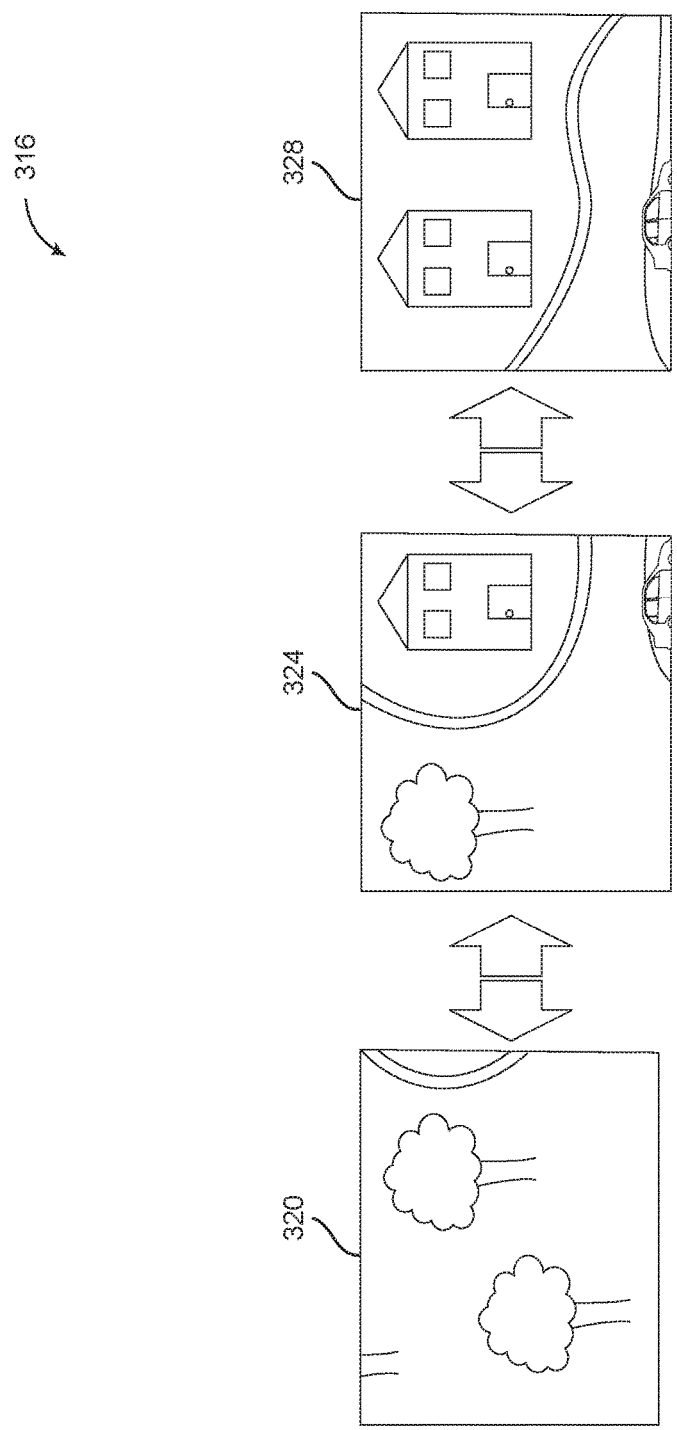

FIG. 3B is an illustration of an example transitional display 316 in accordance with present embodiments. The display 316 may correspond to the display of the transition image 216 as shown in FIG. 2. The display 316 of FIG. 3B includes a plurality of frames that each include a particular subsection of a panoramic image corresponding to a view of the panoramic image from a particular viewing perspective. The display 316 of FIG. 3B shows three frames by way of example and not limitation. A first frame 320, a second frame 324, and a third frame 328 represent different perspectives on the panoramic transition image 216. The first frame 320, the second frame 324, and the third frame 328 may be displayed in response to user input and are not provided in any specific order. Intermediate frames that may be displayed between the first frame 320 and the second frame 324 or between the second frame 324 and the third frame 328 are omitted to simplify the drawing. The user device 108 shifting between the first frame 320, the second frame 324, and the third frame 328 may correspond to a viewer providing input to establish one or more different viewpoints on the transition image 216 so as to effectively "look around" within the transition image 216.

Figure 3C:
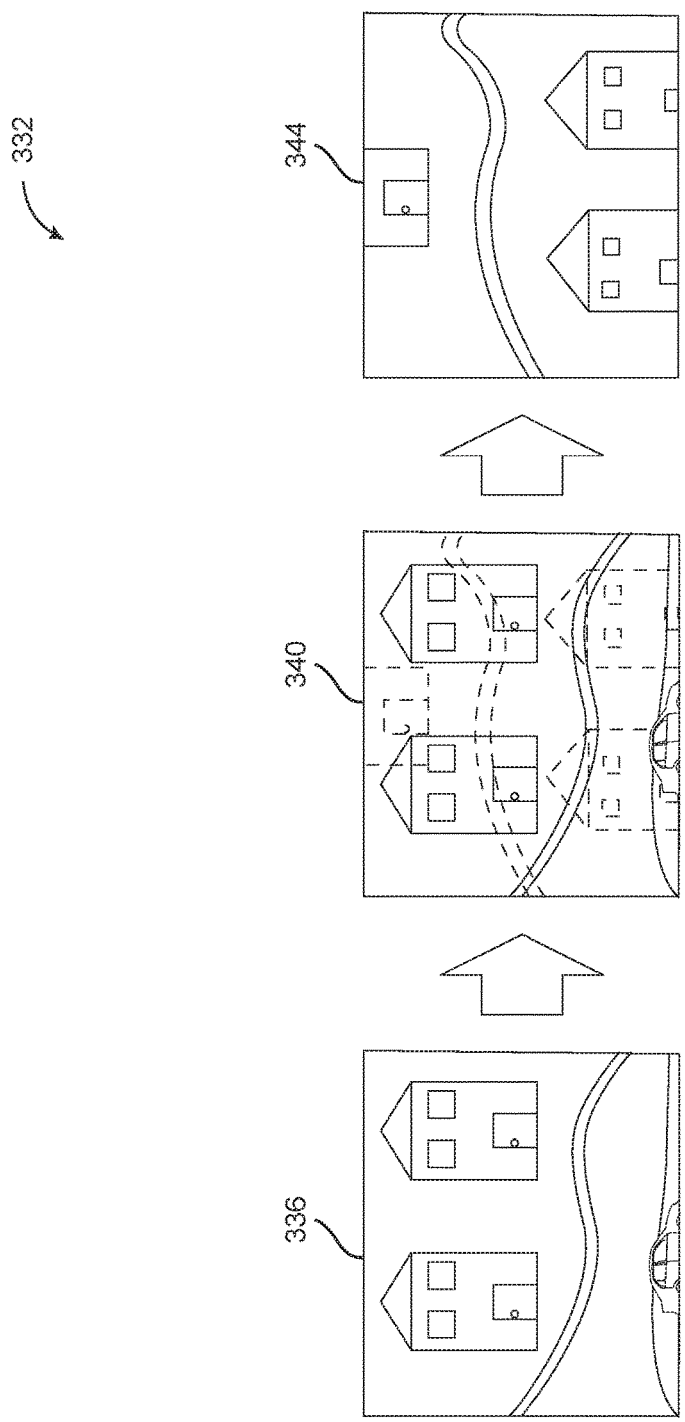

FIG. 3C is an illustration of an example transition 332 in accordance with present embodiments. The transition 332 may correspond to the second transition 224 of FIG. 2. As mentioned, it may be challenging for the user device 108 to display an entire panoramic image all at once on a monitor or other display surface without distortion. In order to avoid distortion of the image, the user device 108 may display a panoramic image in a piecemeal fashion by displaying a particular subsection of a panoramic image at a given time. In this regard, the transition 332 of FIG. 3C includes a plurality of frames that each include a particular subsection of a panoramic image corresponding to a view of the panoramic image from a particular viewing perspective. The transition 332 of FIG. 3C shows three frames by way of example and not limitation. The three frames are displayed in order from first frame 336, second frame 340, to third frame 344. Intermediate frames that may be displayed between the first frame 336 and the second frame 340 or between the second frame 340 and the third frame 344 are omitted to simplify the drawing.

The first frame 336 may correspond to the final frame of the transition image 216 that is displayed at the beginning of the second transition 224. Initially, the first frame 336 may be loaded into the upper graphic layer 124 and the upper graphic layer 124 set to full opacity such that the transition image 208 is visible. As part of the transition 332, the synchronization engine 104 may load a final image into the lower graphics layer 124. The synchronization engine 104 may transition between the transition image and the destination image by bringing the upper graphics layer 120 to full transparency. The synchronization engine 104 may bring the upper graphics layer 120 to full transparency over a period of time so as to provide a gradual transition. This gradual transition is represented by the second frame 340, which may occur with the upper graphic layer 120 at an intermediate transparency level. Thus, in the second frame 340, the transition image and the destination image are both partially visible. The third frame 344 may correspond to the initial frame of the destination image 212 that is displayed at the end of the second transition 224. In the third frame 344, the upper graphic layer 120 is at full transparency and the destination image, which is loaded in the lower graphics layer 124, is displayed.

Figure 4:
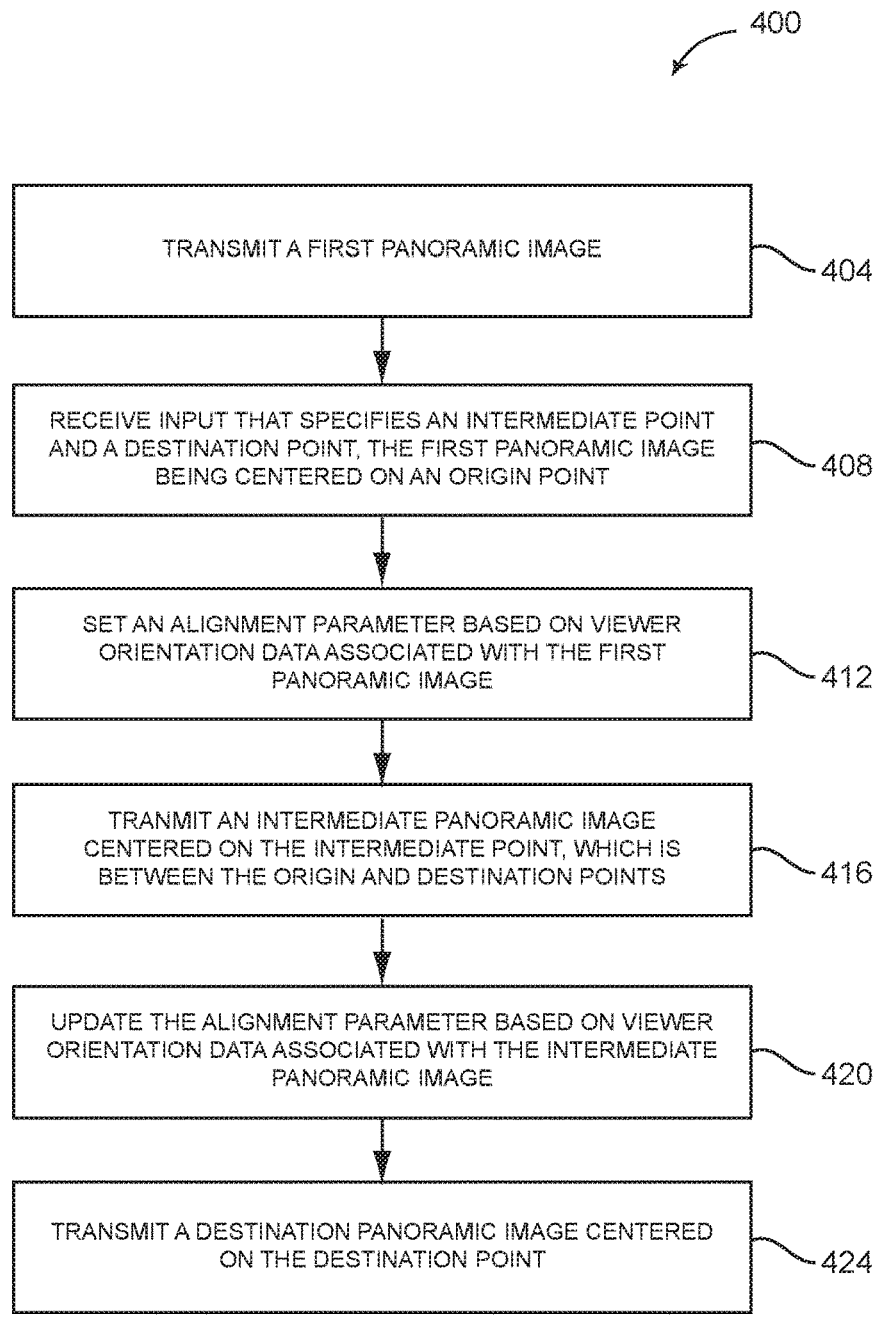
FIG. 4 is flow chart that illustrates operations of a synchronization engine in accordance with the present disclosure.

FIG. 4 is flow chart 400 that illustrates operation of a synchronization engine 104 in accordance with the present disclosure. Initially, in operation 404, the synchronization engine 104 transmits a first panoramic image. The synchronization engine 104 may transmit the first panoramic image to be received by a user device 108, which is generally configured to display one or more panoramic images. The synchronization engine 104 may be generally configured to synchronize display of one or more panoramic images and may be implemented as a network device such as file server, media server, or the like. The synchronization engine 104 and the user device 108 may communicate across a computer or data network such as the Internet. The synchronization engine 104 may retrieve at least the first panoramic image from the database 112 to which the synchronization engine 104 is coupled.

In operation 408, the synchronization engine 104 receives input that specifies an intermediate point and a destination point. The synchronization engine 104 may receive this input from a geographic coordinate mapping module 128 that calculates a composite transition between an origin image and a destination image. The origin image may correspond to the first panoramic image that was transmitted to the user device 108 in operation 404. While the origin image is displayed by the user device 108, the user device 108 may receive input that specifies a particular destination. For example, a user may click on a particular area of a media or player window, the displayed video, or a particular point on a geographic map. The geographic coordinate mapping module 128 may processes this input and generate geographic coordinates that correspond to the selected destination point. The geographic coordinate mapping module 128 may also calculate an intermediate geographic point that is between the origin point and the destination point. The geographic coordinate mapping module 128 may then provide the intermediate and destination points, which are received as input by the synchronization engine 104 in operation 408.

In operation 412, the synchronization engine 104 sets the alignment parameter based on viewer orientation data associated with the first panoramic image. The alignment parameter may include an angular displacement value and/or vertical pitch value that together specify a particular viewer orientation with respect to a panoramic image. The synchronization engine 104 may set an initial value for the alignment parameter in operation 412 based on the origin image. More specifically, the synchronization engine 104 may set the alignment parameter based on an orientation of a final frame that is displayed in connection with the origin image. This final frame may correspond to the frame that is displayed by the user device 108 when a transition away from the origin image begins. The synchronization engine 104 may determine that alignment parameter in this way and then store the alignment parameter locally at the user device 108 or remotely, such as at the database 112.

In operation 416, the synchronization engine 104 transmits an intermediate panoramic image centered on the intermediate point, which is between the origin and destination points. The synchronization engine 104 may access the database 112 to fetch a transition image corresponding to the intermediate point. The synchronization engine 104 may then transmit the transition image to the user device 108. The synchronization engine 104 may utilize the alignment parameter and the different graphic layers 120, 124 associated with the user device 108 to provide a continuous transition between the origin and transition images. The process of providing a continuous transition is described in greater detail with reference to FIG. 6.

In operation 420, the synchronization engine 104 updates the alignment parameter based on viewer orientation data associated with the intermediate panoramic image. Here, the synchronization engine 104 updates the alignment parameter as input is received by the user device 108 that shifts the orientation of transition image. The synchronization engine 104 updates the alignment parameter in this manner so that the alignment parameter accurately reflects a current user perspective. The synchronization engine 104 may store the alignment parameter locally or remotely. In one embodiment, the alignment parameter is only updated based on the final frame of the transition image. In this way, the alignment parameter is updated only once during display of the transition image 216.

In operation 424, the synchronization engine 104 transmits a destination panoramic image centered on the destination point. The synchronization engine 104 may access the database 112 to fetch a destination image corresponding to the destination point. The synchronization engine 104 may then transmit the destination image to the user device 108. The synchronization engine 104 may utilize the alignment parameter and the different graphic layers 120, 124 associated with the user device 108 to provide a continuous transition between the transition and destination images. The process of providing a continuous transition is described in greater detail with reference to FIG. 6.

Figure 5:
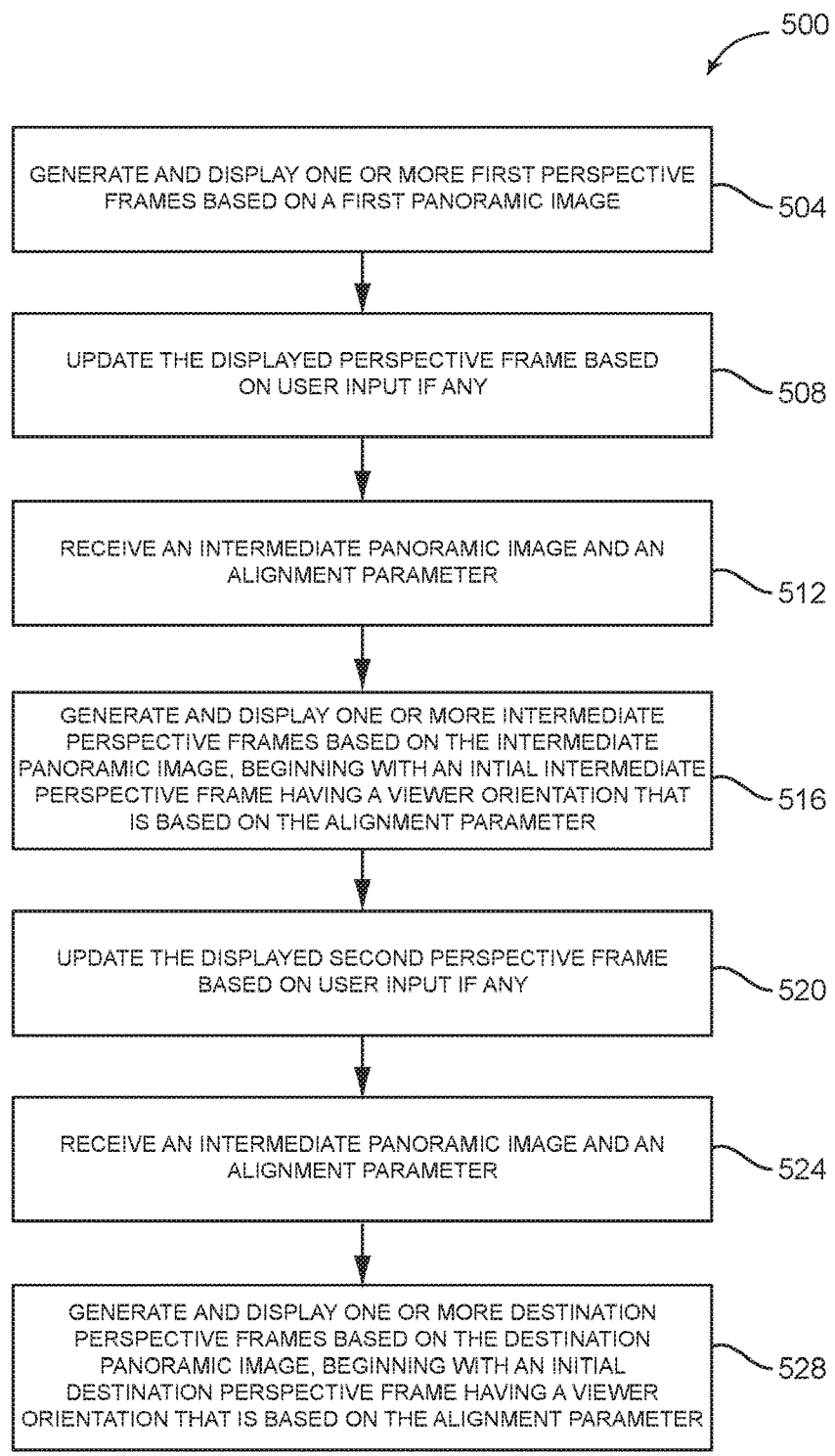
FIG. 5 is flow chart that illustrates operations of a user device in accordance with the present disclosure.

FIG. 5 is flow chart 500 that illustrates operation of the user device 108 in accordance with the present disclosure. Initially, in operation 504, the user device 108 generates and displays one or more first perspective frames based on a first panoramic image. As described in connection with operation 404 of FIG. 4, the first panoramic image may be received from a synchronization engine 104 that communicates with the user device 108 across a computer or data network such as the Internet. The first perspective frame may include a particular subsection of the first panoramic image corresponding to a view of the panoramic image from a particular viewing perspective. In one embodiment, the user device 108 may generate the first perspective frame from the first panoramic based on a default orientation.

In operation 508, the user device 108 updates the displayed first perspective frame based on user input if any. Here, the user device 108 may receive input provided by a viewer or other user of the user device 108 that shifts the orientation of the first panoramic image. The viewer may provide the input to establish one or more different viewpoints on the first panoramic image. For example, a viewer may provide input to the user device 108 that shifts the viewing perspective left, right, up, down, or a combination of these directions.

In operation 512, the user device 108 receives an intermediate panoramic image and an alignment parameter. As described in connection with operation 408 of FIG. 4, the intermediate panoramic image may be received from the synchronization engine 104 that communicates with the user device 108. The synchronization engine 104 may provide the intermediate panoramic image based on input received from a geographic coordinate mapping module 128 that calculates a composite transition between an origin image and a destination image. The alignment parameter may include an angular displacement value and/or vertical pitch value that together specify a particular viewer orientation with respect to a panoramic image. As described in operation 412, the synchronization engine 104 sets the alignment parameter based on viewer orientation data associated with the first panoramic image.

In operation 516, the user device 108 generates and displays one or more intermediate perspective frames based on the intermediate panoramic image, beginning with an initial intermediate perspective frame having a viewer orientation that is based on the alignment parameter. The intermediate perspective frame may include a particular subsection of the intermediate panoramic image corresponding to a view of the panoramic image from a particular viewing perspective. In order to provide for a continuous transition, the user device 108 may generate the intermediate perspective frame from the intermediate panoramic image based on the alignment parameter.

In operation 520, the user device 108 updates the displayed intermediate perspective frame based on user input if any. Here, the user device 108 may receive input provided by a viewer or other user of the user device 108 that shifts the orientation of the intermediate panoramic image. The viewer may provide such input to establish one or more different viewpoints on the intermediate panoramic image. For example, a viewer may provide input to the user device 108 that shifts the viewing perspective left, right, up, down, or a combination of these directions.

In operation 524, the user device 108 receives a destination panoramic image and an alignment parameter. As described in connection with operation 416 of FIG. 4, the destination panoramic image may be received from the synchronization engine 104 that communicates with the user device 108. The synchronization engine 104 may provide the destination panoramic image based on input received from a geographic coordinate mapping module 128 that calculates a composite transition between an origin image and a destination image. The alignment parameter may include an angular displacement value and/or vertical pitch value that together specify a particular viewer orientation with respect to a panoramic image. As described in operation 420, the synchronization engine 104 updates the alignment parameter based on viewer orientation data associated with the intermediate panoramic image. Here, the synchronization engine 104 updates the alignment parameter as input is received by the user device 108 that shifts the orientation of the intermediate image.

In operation 528, the user device 108 generates and displays one or more destination perspective frames based on the destination panoramic image, beginning with an initial destination perspective frame having a viewer orientation that is based on the alignment parameter. The destination perspective frame may include a particular subsection of the destination panoramic image corresponding to a view of the panoramic image from a particular viewing perspective. In order to provide for a continuous transition, the user device 108 may generate the destination perspective frame from the destination panoramic image based on the updated alignment parameter.

Figure 6:
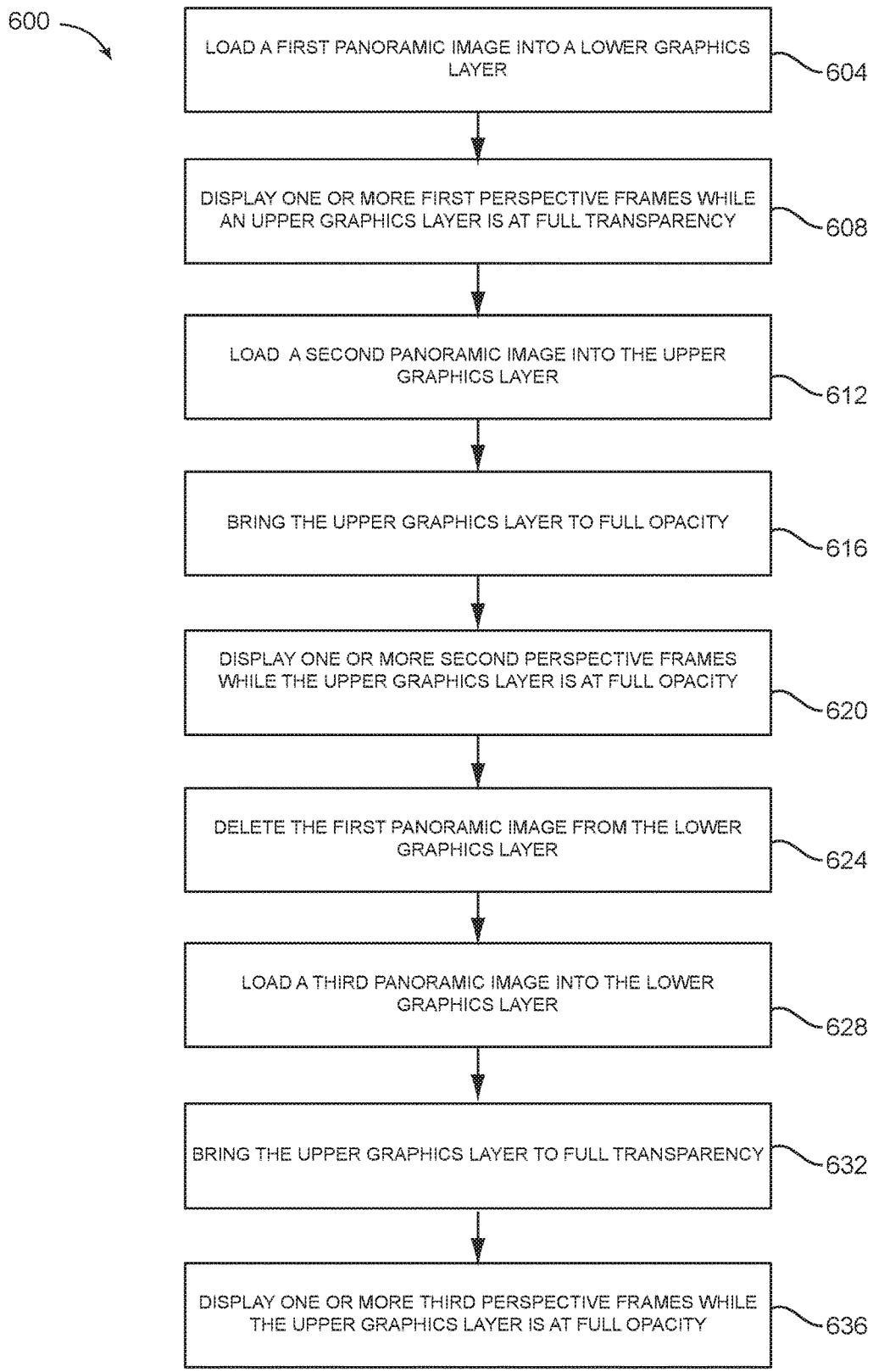
FIG. 6 is flow chart that illustrates additional operation of a user device in accordance with the present disclosure.

FIG. 6 is flow chart 600 that illustrates operation of a user device 108 in accordance with the present disclosure. As mentioned above, the user device 108 may have the graphic functionality including graphics layers where one layer is configured as the upper graphics layer that is arranged above the second layer, which is configured as the lower graphics layer. The upper graphics layer may be adjusted through a range of transparency settings from full transparency to full opacity. With the upper graphics layer at full transparency, only the lower graphics layer is visible. With the upper graphics layer at full opacity, only the upper graphics layer is visible. With the upper graphics layer set to an intermediate level of transparency, a combination of the upper graphics layer and the lower graphics layer is visible.

Initially, in operation 604, the user device 108 loads a first panoramic image into the lower graphics layer. As described in connection with operation 404 of FIG. 4, the first panoramic image may be received from a synchronization engine 104 that communicates with the user device 108 across a computer or data network such as the Internet. Operation 604 may additionally include setting the upper graphic layer to full transparency.

In operation 608, the user device 108 displays one or more first perspective frames while the upper graphics layer is at full transparency. As described in connection with operation 504 of FIG. 5, the user device 108 may generate the one or more first perspective frames based on the first panoramic image. With the upper graphics layer at full transparency, the lower graphics layer including the first perspective image is visible.

In operation 612, the user device 108 loads a second panoramic image into the upper graphics layer. As described in connection with operation 408 of FIG. 4, the second panoramic image may be received from the synchronization engine 104 that communicates with the user device 108. In operation 616, the user device 108 brings the upper graphics layer to full opacity. In so doing, the user device 108 makes the upper graphic layer visible. Thus, in operation 620, the user device 108 displays one or more second perspective frames while the upper graphics layer is at full opacity. As described in connection with operation 516 of FIG. 5, the user device 108 may generate the one or more second perspective frames based on the second panoramic image.

In operation 624, the user device 108 deletes the first panoramic image from the lower graphics layer. Here, the first panoramic image is deleted in preparation for loading additional data. Thus, in operation 628, the user device 108 loads a third panoramic image into the lower graphics layer. As described in connection with operation 424 of FIG. 4, the third panoramic image may be received from the synchronization engine 104 that communicates with the user device 108. In operation 632, the user device 108 brings the upper graphics layer to full transparency. In operation 636, the user device 108 displays one or more third perspective frames while the upper graphics layer is at full opacity.

Figure 7:
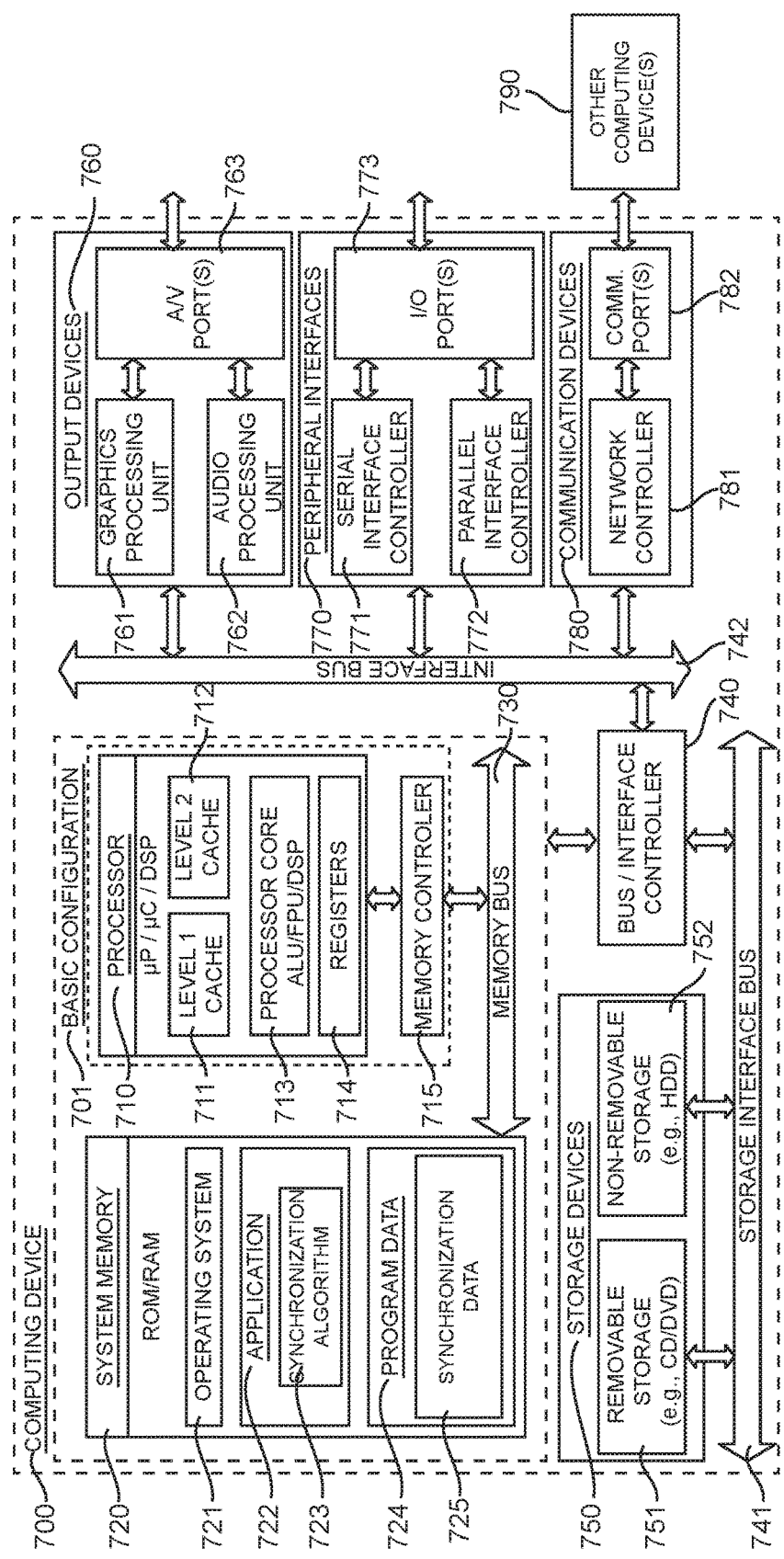
FIG. 7 is a block diagram illustrating an example computing device that is arranged for synchronizing display of one or more panoramic images in accordance with the present disclosure.

FIG. 7 is a block diagram illustrating an example computing device 700 that is arranged for synchronizing display of one or more panoramic images in accordance with the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 may include one more levels of caching, such as a level one cache 711 and a level two cache 712, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include a synchronization algorithm 723 that is arranged to synchronize display of one or more panoramic images. Program Data 724 includes panoramic images, timing information, alignment parameters and other data 725 that is useful to synchronize display of one or more panoramic images, as will be further described below. In some embodiments, application 722 may be arranged to operate with program data 724 on an operating system 721 such that frames of a plurality of panoramic images are displayed and synchronized at a display device. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which may be configured to communicate to various external devices such as a display or speakers via one or more A/V ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. For example, if a user determines that speed and accuracy are paramount, the user may opt for a mainly hardware and/or firmware vehicle, if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). In one example, mechanisms of the subject matter described herein may be distributed via a web browser (e.g., Internet Explorer, Chrome, Firefox) or a WAMP or MAMP server to play content.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computer/communication and/or network computer/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of transitioning between panoramic video frames, comprising:
   transmitting a first panoramic image sphere;
   displaying one or more first perspective frames of the first panoramic image sphere;
   receiving a destination point input;
   determining an alignment parameter based on an orientation associated with one of the one or more first perspective frames that is being displayed;
   transmitting an intermediate panoramic image centered at a point between an origin point and a destination point, wherein the first panoramic image sphere is centered at the origin point;
   displaying one or more intermediate perspective frames of the intermediate panoramic image, wherein displaying the one or more intermediate perspective frames includes displaying an initial one of the one or more intermediate perspective frames oriented based on the alignment parameter;
   transmitting a destination panoramic image centered at the destination point; and
   displaying one or more destination perspective frames of the destination panoramic image sphere, wherein displaying the one or more destination perspective frames includes displaying an initial one of the one or more destination perspective frames oriented based on the alignment parameter.

2. The method of claim 1, further comprising:
   loading the first panoramic image sphere into a lower graphics layer;
   displaying the one or more first perspective frames with an upper graphics layer at full transparency;
   loading the intermediate panoramic image sphere into the upper graphics layer;
   displaying the one or more intermediate perspective frame with the upper graphics layer at full opacity;
   loading the destination panoramic image sphere into the lower graphics layer;
   displaying the one or more destination perspective frames with the upper graphics layer at full transparency.

3. The method of claim 1, further comprising:
   sensing a user input indicating a new viewer orientation, the user input received while displaying the one or more intermediate perspective frames;
   updating the alignment parameter based on the new viewer orientation before displaying the initial destination perspective frame; and
   responding to the user input by displaying a subsequent intermediate perspective frame that is generated based on the intermediate panoramic image sphere and the new viewer orientation.

4. The method of claim 1, further comprising:
   generating the one or more second perspective frames by panning and tilting the second panoramic sphere responsive to user input that specifies different viewer perspectives.

5. The method of claim 4, wherein panning and tilting the second panoramic sphere includes displaying the second panoramic frame as a still image for a defined duration to allow different viewer perspectives to be displayed responsive to user input.

6. The method of claim 4, wherein panning and tilting the second panoramic frame includes playing a video for a defined duration while receiving user input that specifies different viewer perspectives.

* * * * *